(12) United States Patent
Vangsness et al.

(10) Patent No.: US 7,086,932 B2
(45) Date of Patent: Aug. 8, 2006

(54) POLISHING PAD

(75) Inventors: Jean Vangsness, Stow, MA (US); Oscar Kai Chi Hsu, Chelmsford, MA (US); Alaka Potnis, Hudson, NH (US)

(73) Assignee: Freudenberg Nonwovens, Lowell, MA (US)

( * ) Notice: Subject to any disclaimer, the term of this patent is extended or adjusted under 35 U.S.C. 154(b) by 0 days.

(21) Appl. No.: 10/843,111

(22) Filed: May 11, 2004

(65) Prior Publication Data

US 2005/0255794 A1 Nov. 17, 2005

(51) Int. Cl.
  *B24B 1/00* (2006.01)
(52) U.S. Cl. ......................... 451/28; 451/532
(58) Field of Classification Search .............. 451/28, 451/41, 36; 51/298–300; 428/295.1, 297.4
  See application file for complete search history.

(56) References Cited

U.S. PATENT DOCUMENTS

| | | |
|---|---|---|
| 4,789,648 A | 12/1988 | Chow et al. |
| 4,944,836 A | 7/1990 | Beyer et al. |
| 5,533,923 A | 7/1996 | Shamouilian et al. |
| 5,605,760 A | 2/1997 | Roberts |
| 5,893,796 A | 4/1999 | Birang et al. |
| 6,022,264 A | 2/2000 | Cook et al. |
| 6,099,394 A | 8/2000 | James et al. |
| 6,171,181 B1 | 1/2001 | Roberts et al. |
| 6,375,559 B1 | 4/2002 | James et al. |
| 6,454,633 B1 | 9/2002 | Reinhardt et al. |
| 6,488,570 B1 | 12/2002 | James et al. |
| 6,533,645 B1 * | 3/2003 | Tolles ............. 451/41 |
| 6,582,283 B1 | 6/2003 | James et al. |
| 6,645,264 B1 | 11/2003 | Hasegawa et al. |
| 6,712,681 B1 * | 3/2004 | Chen et al. ......... 451/532 |
| 2002/0127862 A1 | 9/2002 | Cooper et al. |
| 2003/0013397 A1 | 1/2003 | Rhoades |
| 2003/0100250 A1 * | 5/2003 | West ............. 451/288 |

OTHER PUBLICATIONS

Kornon Co., Ltd., Bicomponent Fibers, http://www.kornon.com/english/sub/fiberfornon/bicomponentfibers.htm.
FiberVisions, Bicomponent fiber, http://www.fibervisions.dk/bicomponent-fiber.html.
Fiber Innovation Technology, Bicomponent Fibers, http://www.fitfibers.com/bicomponent_fibers.htm.
Hills Inc., An Introduction to Bicomponent Fibers, http://www.hillsinc.net/bicointro.shtml.
Apparel Search Company, P.K. Jangala and R. Kotra, Bicomponent Fibers, http://www.apparelsearch.com/education_research_nonwoven_bicomponent_fiber.htm.

* cited by examiner

*Primary Examiner*—Dung Van Nguyen
(74) *Attorney, Agent, or Firm*—Grossman, Tucker, Perreault & Pfleger, PLLC

(57) ABSTRACT

An improved polishing pad for polishing semi-conductors and other planar substrates in the presence of a slurry which optionally may contain abrasive particles is disclosed. The polishing pad comprises a non-woven fibrous component, a portion which may optionally comprise bicomponent fibers, optionally embedded within a polymer matrix component.

12 Claims, 1 Drawing Sheet

POLISHING PAD

FIELD OF THE INVENTION

The present invention relates to polishing pads and more particularly to a novel composition and method for forming polishing pads. The polishing pads of the present invention are especially useful in chemical-mechanical planarization of substrates during the manufacture of semi-conductor and related devices. The invention relates to pads comprising a needle-punched non-woven textile, a portion or the entirety of which may comprise bicomponent fibers, optionally embedded in a polymeric binder. The pads are suitable for chemical-mechanical polishing, either with or without a need for abrasives to be included in the polishing slurry. The pads formed from the needle-punched non-woven textile and optional polymeric binder may be processed in a manner to supply pads having unique hardness characteristics that have been found more suitable for the polishing operation. In addition, the pads of the present invention may be produced using an uncomplicated continuous process.

BACKGROUND OF THE INVENTION

For many years, optical lenses and semiconductor wafers have been polished by chemical-mechanical means. More recently, this technique has been applied as a means of planarizing intermetal dielectric layers of silicon dioxide and for removing portions of conductive layers within integrated circuit devices as they are fabricated on various substrates. For example, a conformal layer of silicon dioxide may cover a metal interconnect such that the upper surface of the layer is characterized by a series of non-planar steps corresponding in height and width to the underlying metal interconnects.

The rapid advances in semiconductor technology has seen the advent of very large scale integration (VLSI) and ultra large scale integration (ULSI) circuits resulting in the packing of very many more devices in smaller areas in a semiconductor substrate. The greater device densities require greater degrees of planarity to permit the higher resolution lithographic processes required to form the greater number of devices having smaller features incorporated in current designs. Moreover, copper, because of its low resistance, is increasingly being used as interconnects. Conventionally, etching techniques are used to planarize conductive (metal) and insulator surfaces. However, certain metals, desirable for their advantageous properties when used as interconnects (Au, Ag, Cu) are not readily amenable to etching, thus the need for chemical-mechanical polishing (CMP).

Typically, the various metal interconnects are formed through lithographic or damascene processes. For example, in a lithographic process, a first blanket metal layer is deposited on a first insulating layer, following which electrical lines are formed by subtractive etching through a first mask. A second insulating layer is placed over the first metallized layer, and holes are patterned into the second insulating layer using a second mask. Metal columns or plugs are formed by filling the holes with metal. A second blanket metal layer is formed over the second insulating layer, the plugs electrically connecting the first and second metal layers. The second metal layer is masked and etched to form a second set of electrical lines. This process is repeated as required to generate the desired device. The damascene technique is described in U.S. Pat. No. 4,789,648, to Chow, et al.

Presently, VLSI uses aluminum for the wiring and tungsten for the plugs because of their susceptibility to etching. However, the resistivity of copper is superior to either aluminum or tungsten, making its use desirable, however copper does not have desirable properties with respect to etching.

Variations in the heights of the upper surface of the intermetal dielectric layer have several undesirable characteristics. The optical resolution of subsequent photolithographic processing steps may be degraded by non-planar dielectric surfaces. Loss of optical resolution lowers the resolution at which lines may be printed. Moreover, where the step height is large, the coverage of a second metal layer over the dielectric layer may be incomplete, leading to open circuits.

In view of these problems, methods have been evolved to planarize the upper surfaces of the metal and dielectric layers. One such technique is chemical-mechanical polishing (CMP) using an abrasive polishing agent worked by a rotating pad. A chemical-mechanical polishing method is described in U.S. Pat. No. 4,944,836, to Beyer, et al. Conventional polishing pads are made of a relatively soft and flexible material, such as non-woven fibers inter-connected together by a relatively small amount of a polyurethane adhesive binder, or may comprise laminated layers with variations of physical properties throughout the thickness of the pad. Multilayer pads generally have a flexible top polishing layer backed by a layer of stiffer material.

The CMP art combines the chemical conversion of the surface layer to be removed, with the mechanical removal of the conversion product. Ideally, the conversion product is soft, facilitating high polishing rates. CMP pads must resolve two constraints relevant to the present invention. The surface in contact with the substrate to be polished must be somewhat resilient. Of particular relevance to the present invention is the problem of local over-polishing, also known as "dishing." This is one of the key problems encountered during CMP of metal substrates. It is generally known that prevention of dishing requires a stiffer pad. However, associated with stiffer pads is the tendency towards an increased number and density of surface scratches and defects. Such defects correlate with low yields of product.

Some of the most commonly used polishing pads for manufacturing semi-conductor chips are a very soft foam pad, or a soft non-woven fiber pad. An advantage of a soft polishing pad is low defect density on the polished wafer and good within-wafer uniformity. However, soft CMP pads suffer from very short pad life requiring replacement after polishing about 50 wafers, and excessive dishing of the polished wafer because of the pad softness. Also, for a metal damascene CMP process, a soft pad usually causes much more dishing compared with a hard pad.

It is generally known that prevention of dishing requires a stiffer pad. Thus, a hard polishing pad usually has better planarization capability than a soft pad. However, the defects count is much higher than with the soft pad and the within-wafer uniformity is usually much worse. In addition, hard pads may be conditionable, which means that the pad surface condition can be regenerated using a diamond disk or an abrasive roller to recondition the pad surface by removing worn areas and embedded debris. This reconditioning capability means that a hard pad may last much longer than a soft pad. Such reconditioning in situ also means that polishing tool down-time for pad replacement is greatly reduced.

Currently, these problems are handled using multi-step techniques wherein initial polishing is effected at a high rate using one set of pads and abrasive compounds, followed by a second polishing step using a second set of pads and abrasive compounds differently optimized in comparison to the first set. This is a time-consuming process and, moreover, it also suffers from high defect densities due to the use of two different pads. For Cu planarization, CMP pads are critical, and are as important as the abrasive slurry. The prior art has suggested that a single-layered pad was either too stiff or too soft to obtain good planarization. Stacked nonwoven and other types of pads have previously been tried in an attempt to obtain better CMP performance. However, thin (5 to 20 mil thick) fibrous pads have not been sufficiently durable and do not survive the CMP process.

Accordingly, the need exists for improved fibrous polishing pads. A high quality pad should meet the following requirements: produce extremely low defects counts on polished surfaces, cause extremely small dishing and extremely low erosion of polished surfaces, and have a long pad life extendible by reconditioning. None of the existing prior art CMP pads can meet all of these requirements, which are needed for the future generation of CMP processes. A new type of CMP pad is therefore needed to meet these requirements, particularly one manufactured by an uncomplicated continuous process.

SUMMARY OF THE INVENTION

In one embodiment, the present invention is directed at a pad for polishing a substrate comprising a first component comprising a non-woven fibrous component, at least a portion of which or the entirety of which optionally comprises bicomponent fibers, and optionally a second component comprising a polymer matrix component, said fibrous component embedded in said polymer matrix component.

In method form, the present invention comprises a process for manufacturing a polishing pad, comprising the steps of providing a non-woven fibrous component, at least a portion of which or the entirety of which optionally comprises bicomponent fibers, optionally providing a polymer matrix to coat said non-woven fibrous component, combining said non-woven fibrous component with said polymer matrix, and subjecting said polymer matrix and non-woven fibrous component to a temperature range "T" and pressure to solidify and form a composite sheet for use as said polishing pad. In such process the bicomponent fiber may include one component with a melting point of $Tm_1$, one component with a melting point $Tm_2$, wherein $Tm_1 < Tm_2$, and wherein $Tm_1$ is within temperature range "T". Alternatively, one may employ a binder fiber which has a melting point with the temperature range "T".

The present invention also relates to a polishing pad for polishing a substrate in the presence of a slurry which may or may not contain abrasive particles. The polishing pad herein is also suitable for manufacture via a continuous manufacturing process.

The pads in certain embodiments may also be characterized as a relatively thin, stiff and hard construction. The polishing properties of the top layer of the pad of the present invention may be uniquely varied by the choice and characteristics of non-woven fibers used, by the choice of the optional polymeric matrix (binder) used and by the increase in density of the non-woven textile compared to the finished pad due to the level of saturation and compression used in the pad manufacturing process.

The present invention also relates to a method of producing the above-disclosed polishing pad. In particular, the method comprises combining a needle-punched non-woven textile, at least a portion of which or the entirety of which may comprise bicomponent fibers, with a polymeric binder to a desired level and forming a thin sheet under heat and pressure, followed by surface finishing. The application of heat and pressure serves to activate a portion of the bicomponent fibers results in a sheet with improved physical properties. The application of pressure further serves to control the thickness and density of the sheet. The sheet is cut to shape and may optionally be backed with a substrate to form a polishing pad. The polishing pad of the present invention may be applied to a diversity of applications including semiconductor wafer polishing known as chemical mechanical polishing (CMP) and other polishing applications for metal, ceramic, glass, wafers, hard disks etc., that employ a liquid medium as a polishing slurry.

DESCRIPTION OF THE DRAWINGS

The invention may be further understood by reference to the detailed description below taken in conjunction with the accompanying drawings, in which.

DESCRIPTION OF THE PREFERRED EMBODIMENT

Figure 1:
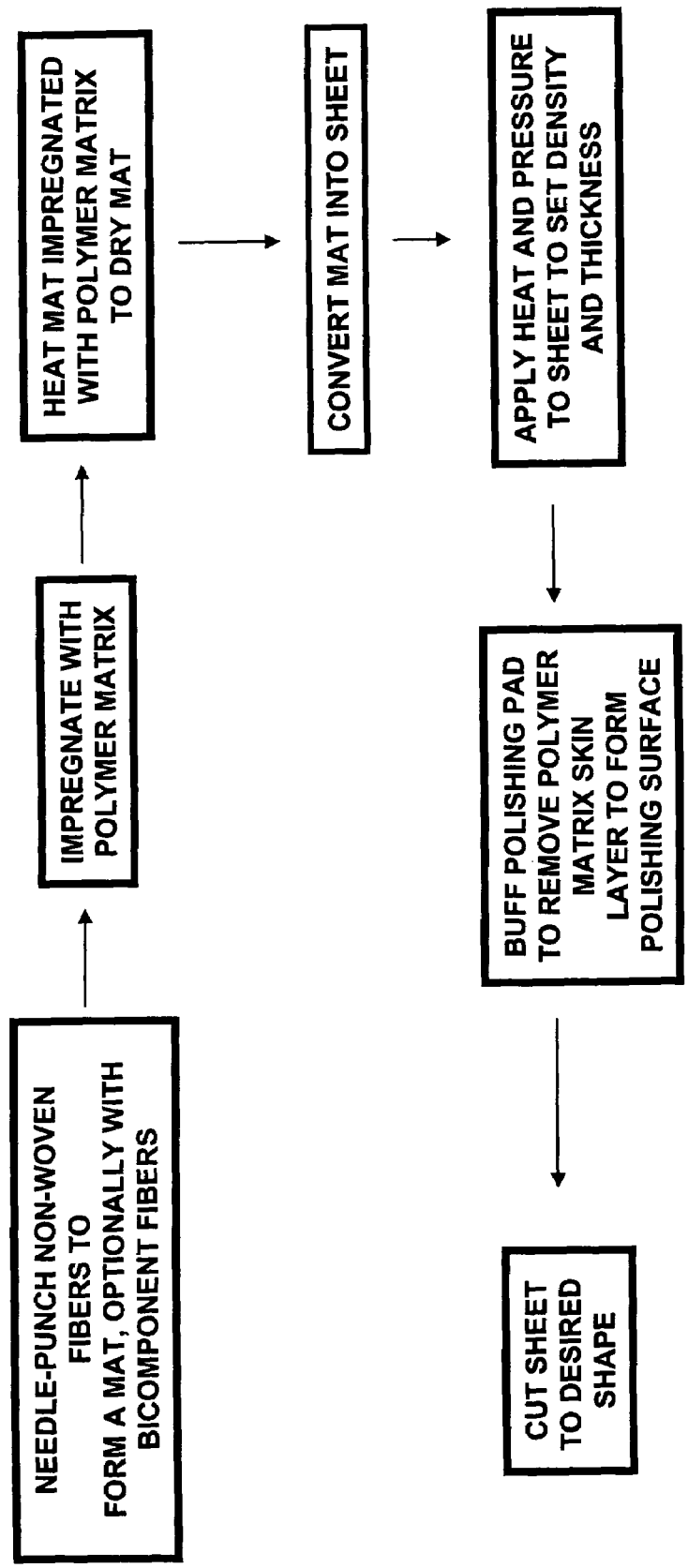
FIG. 1 is a schematic of one preferred manufacturing process according to the present invention.

Still other objects and advantages of the present invention will become readily apparent to those skilled in the art from the following detailed description, wherein preferred embodiments of the invention are shown and described, and as illustration of the best mode contemplated of carrying out the invention. As will be realized by the skilled person, the invention is capable of other and different embodiments, and its details are capable of modifications in various respects, without departing from the invention.

A polishing pad comprises a first fibrous non-woven polymer component optionally embedded in a second polymer matrix (binder) component. Typical non-woven textiles suitable for use in this invention as the fibrous component of the polishing pad are preferably polyester, although polypropylene, polyamide, acrylic, polyethylene, cellulosic materials, such as rayon, and combinations of these fibers may be used. In particular, bicomponent fibers, wherein the core and sheath materials may be different from one another, or in a side-by side configuration, may be preferably used as at least a portion of the fibrous component or as the entire fibrous component. The listed fibers are meant to be illustrative of the types that may be used, but the invention is not thereby limited to the enumerated types. The fiber component may be preferably present at levels between 10–90% (wt) with respect to the polymer matrix (binder) component.

The fibers and matrix polymers together typically form a pad, or the fibers alone may form the pad, which in either case has a hardness of about 10 Shore D to about 70 Shore D, and preferably about 30 Shore D to about 70 Shore D, as measured by Durometer Hardness test method ASTM D2240. In addition, all hardness ranges within said ranges may be employed for the preparation of the polishing pads disclosed herein. Accordingly, hardness values of 10D, 11D, 12D and so on, up to a preferred level of 70D are contemplated herein.

The optional bicomponent fibers employed herein, preferably of a sheath-core construction, or a side-by-side configuration, and provide an advantageous feature as the melting point of one of the components may be configured to match the temperature attained in the pressing and curing process. Alternatively, one may employ a binder fiber, which also may have a melting point that is within the range of temperatures achieved in the pressing process. Without being bound by theory, it is believed that this may allow for an improved level of binding between the fibers and the polymer matrix component. However, in the broad context of the present invention, and as discussed more fully herein, a sheath-core construction is not the only form of bicomponent fibers, as the invention herein contemplates bicomponent fibers of other constructions, such as a physical blend of two fibers.

Useful polymeric materials for the polymer matrix component include most common thermoplastic and thermosetting polymers, in any physical form such as a polymer dispersion and/or non-dispersions such as solutions and/or pure resins, and include, but are not limited to polymers such as polyurethanes, polyacrylates, polystyrenes, polyamides, polycarbonates, and epoxies. Other polymers that have a rigidity sufficient to support the fibrous component may also be used. In this regard, it can be appreciated that such polymer matrix components themselves may have a melting point (in the case of crystalline polymers), softening temperature (in the case of amorphous polymers), and/or curing temperature (in the case of thermoset polymers) which allows such polymer matrix component to be processed with the above referenced fibrous component to form the polishing pads of the present invention.

The fibrous component is preferably in the form of a non-woven web or mat, which has preferably been needle-punched to a basis weight of about 100 to about 2500 grams per square meter, and at any value or any range therebetween. For example, the range may be between about 300–1500 grams per square meter. The optional bicomponent fibers or binder fibers may be combined with the preferably non-woven polymer at any desired proportion, or the bicomponent fibers may completely replace the non-woven polymer component.

The chemical-physical properties, hence the polishing performance, of the fiber and polymer composite are governed by the types and sizes of the fibers, the types and hardness of the polymers, the fiber to polymer ratio, the friability of the polymers, and the local and global distribution of the polymer matrix within the fiber mat. For example purposes, employing a larger denier fiber (thus with fewer fibers for a given density of the fiber mat) and the use of a high fiber:polymer ratio will typically result in a pad structure having a lower overall density and surface hardness, and a higher compressibility as compared to the use of smaller denier fiber. In addition, and by way of example, if fiber denier is held constant, the polymer matrix material can be altered to influence density and hardness characteristics of the final pad product.

As alluded to above, the optional use of bicomponent fibers as a portion of the fiber mat of the present invention provides some unique properties to the polishing surface of the polishing pad. Bicomponent fibers are produced by extruding two polymers from the same spinnerette with both polymers contained within the same filament. While there are a number of constructions of bicomponent fibers (side-by-side, matrix-fibril, pie-wedge, islands/sea, etc.), a sheath/core construction is preferred in the present invention wherein the surrounding sheath portion comprises a polymer having a lower melting temperature than the polymer of the core portion.

As noted, the pads of the present invention may comprise about 10 to about 100 percent by weight of the fibrous component, the 100 percent level referring to that optional embodiment where the pad is composed entirely of the fibrous component, and wherein the numbers less than 100 percent correspond to that optional embodiment which includes a polymeric component. Accordingly, in the event that the fibrous component does not comprise 100 percent of the pad, and a polymeric component is employed, such polymeric component may be present at any corresponding level to make-up for the reduction from 100% for the fibrous component. However, in preferred embodiment, the polymeric component may be present at levels of about 10–90 percent, or at any other individual percentage or range, e.g., at a level of about 40 percent to 60 percent by weight.

In addition, the pads of any of the embodiments of the present invention may have a preferred thickness range of about 0.5 mm to 5.0 mm, and at any value or range therebetween. Accordingly, e.g., the thickness range may be between about 0.5 mm to 3.0 mm.

To preferably develop a desired hardness in the pad, the fibrous component preferably comprises a relatively loose network of fibers and this network is substantially completely filled with the polymeric matrix binder material to form a composite in which the fibrous component becomes embedded after the polymer is solidified. The solidified polymer preferably forms a relatively hard but friable matrix. After the sheet has been pressed to the final thickness, the top surface of the sheet may be conditioned by buffing with a diamond disk or opposing inline abrasive rollers to remove the skin-like polymer surface and expose about a 1 to 2 mil thickness (0.025 to 0.052 mm) of the fiber mat, which thereby creates about a 1 to 2 mil thick fiber surface layer containing fibers that are partially free. The creation of this surface layer results from the friable nature of the cured polymer matrix. In other words, the strength of the fiber is stronger than the binder or polymer matrix material such that, during buffing, the binder is removed at the surface while the surface fibers remain attached to the fiber and polymer composite. Thus, after buffing, a small thickness of depth of surface polymer is removed to leave a thin surface layer of free fibers, segments of at least a portion of which remain embedded in the adjacent composite body of polymer and fibers. During CMP processes, this fibrous polishing surface helps to reduce the defects count caused by using a conventional hard pad. In addition, the solid matrix formed by the polymer densely filling the fiber mat or fibrous component herein preferably increases the hardness of the pad.

Accordingly, the thin fibrous surface layer of the preferred pad of the present invention significantly reduces the defects count of the wafers polished therewith, and the hard stiff body results in much less dishing of the polished wafer surface. As a result, metal dishing can be minimized. In addition, erosion of the wafer surface is reduced.

In addition, the top layer surface of the pads herein may be reconditioned after polishing one or more wafers to maintain a high performance level. This makes the pad service life much longer than conventional soft fiber-based pads. The conditioning process can actually recreate the thin (about 1 to 2 mils) fibrous surface layer which continues to help reduce the defects count, while the underlying hard fiber and polymer body sufficiently fixes and supports the fiber layer to reduce the dishing phenomenon.

Optionally, to form a polishing pad, an adhesive-backed structure may be attached to the backing surface of the composite as an alternate means to affix the pad to a tool. The backing structure may provide a medium for attaching the polishing pad to a tool and add compressibility to complement the rigidity of the composite material layer. The rigidity of the composite material layer provides planarity on a small scale, that is, over a small region of the substrate to be polished. The compressibility of the backing structure provides uniformity of pressure over the entire substrate surface, for example over the 8 inch or 12 inch diameter of a semi-conductor wafer. This ensures uniformity of polishing if, for example, the substrate is concavely or convexly curved or otherwise irregular.

Alternatively, the present invention herein contemplates the use of, e.g., a Mylar™ film, containing pressure sensitive adhesive (PSA) on both sides of the polymeric film utilized therein to facilitate attachment to a tool. In this situation, it is contemplated that such Mylar™ film will provide more of an incompressible layer, but still efficiently serve as a means of attachment of the pad to the tool for effective polishing.

In addition, in yet another further optional embodiment, the polishing pads of the present invention may include a fibrous or particle (e.g. powder) component that is soluble or swellable in the polishing slurry, such that fibers or particles of the present invention may dissolve upon contact with the slurry, including slurries that are either water based or non-water based. In semiconductor wafer polishing the slurry is typically an aqueous medium, and the solvent is typically water.

Such additional fibrous or particle component may therefore be formed of various suitable polymer materials, preferably including poly(vinyl alcohol), derivatives of poly(vinyl alcohol), copolymers of poly(vinyl alcohol), polyacrylic acid, derivatives of polyacrylic acid, copolymers of polyacrylic acid, polysaccharides, derivatives of polysaccharides, copolymers of polysaccharides, gums, derivatives of gums, copolymers of gums, maleic acid, derivatives of maleic acid, or copolymers of maleic acid. Such fibrous or particle component is also preferably prepared by any suitable process, such as be nonwoven techniques, for example chemical, mechanical or thermal bonding of fibers or the laying down of a loose mat of fibers or filaments as well as by weaving or knitting techniques. In addition, the orientation of these optional fibers relative to the polishing surface may be controlled, e.g., such fibers may be orientated predominantly parallel to the surface, or preferably in an orthogonal configuration. The fibers or particles, being soluble, may also be selected such that after dissolution, a pore is formed, wherein such pore size is complimentary to the particle size of an abrasive particle that may be in the slurry. Such abrasive particles typically range in size from 100–200 nm. Accordingly, a fiber diameter range of 20–200 μm is preferably employed, which has been found to provide the optimum size for interacting with the particles of the slurry to optimize wafer polishing. Furthermore, the optional soluble or swellable fibers of particles noted above may be present in the polishing pad herein at levels between 10% (wt) to 90% (wt).

The process for forming one embodiment of the polishing pad of the present invention, i.e. that embodiment that combines the fiber component with the polymer matrix component, will now be described. With attention directed to FIG. 1, the non-woven fibers, optionally including the bicomponent fibers, can be needle-punched to form a mat. This is followed by impregnation with the polymer matrix component using a process such as, but not limited to, spraying, dipping, knife-over-roll, or transfer coating to substantially saturate the mat with binder. The mat is then heated with the polymer matrix component to an effectively dry condition. Then, the dried material is cut into a sheet. Then, after heating to dry as noted above, the process is followed by application of heat and pressure to the sheet to set the density and thickness. Such temperatures may preferably fall in the range of about 200–550° F., and the pressures may be preferably be up to 2000 psi, or within the range of about 500–2000 psi. The sheet so formed is then buffed to remove polymer matrix skin material to form the polishing surface, and the sheet can then be conveniently cut to a desired shape. Optionally, after buffing, an adhesive layer may be applied to the sheet. In addition, after cutting into a desired shape, the polishing pad may be converted in any conventional manner, such as the incorporation of other physical features into the pad (e.g. grooving) to further improve polishing performance.

In an alternative process, one can avoid the use of the polymeric matrix component, and make use of the non-woven component. In this situation, the non-woven is cut into sheet, and heated and pressed to set the density and thickness, similarly at preferred temperatures of about 200–550° F. and pressures up to about 2000 psi, and cut into a desired shape, and also optionally converted as noted above.

Table I below summarizes the working examples of the pads that were manufactured according to the general methods of the present invention.

TABLE I

| Physical Property | Pad Composition 15% Bico Binder: UD220 [40–60% wt.] (40%–60%) | 15% Bico Binder 1049C [40–60% wt.] (40%) (60%) | Pad Composition 75% Bico Binder UD220 [40–60% wt.] (40%) (60%) | Pad Composition 75% Bicomponent/Two Pads Pressed Together* 60% Binder UD220 |
|---|---|---|---|---|
| Thickness (mm) | .5–1.5 | .5–1.5 | .5–1.5 | 1.0–2.0 |
| Weight (g/m2) | 400–700 | 400–750 | 350–750 | 700–1400 |
| Density (g/cc) | .4–1.0 | .4–1.0 | .5–1.0 | .6–1.0 |
| Hardness (ShoreD) | 30–70 | 30–70 | 30–70 | 30–70 |
| Compressibility (%) | 1.0–4.0 | 1.0–4.0 | 1.0–4.0 | .5–2.0 |

All data in Table I applies to buffed and pressed pads
Bondthane UD220 (Bond Adhesives & Coatings Corp)(aliphatic polyester urethane dispersion)
Sancure 1049C (Noveon Specialty Chemicals)(aliphatic waterborne urethane polymer)
*Two pads pressed together were 60% binder and 75% bicomponent, pressed together at about 20,000 lbs. at 300° F.

In addition, it can be seen from the above that in yet another preferred embodiment of the present invention, two pads may be pressed/bonded together. In such case, thickness naturally increases, and compressibility decreases. Accordingly, the present invention contemplates one or a plurality of pad layers for a polishing pad application.

Furthermore, as noted herein, the present invention contemplates the use of a needle punched non-woven fiber web, without a polymer matrix component, at a basis weight of 1000 g/m². Such product is contemplated as having a thickness of 1.5–2.5 mm, a density of 0.5–1.0 g/cc, a hardness of 30D–70D, and a compressibility of 0.5–2.0%.

In addition, it should be noted that "Compressibility" in Table I is established by the following procedure: Test samples are specified. Test equipment is an Ames gages (Model BG2600-1-04). First one determines the initial thickness using one specified Ames gage which has a 287 gram loading, ½" diameter anvil and ⅜" diameter foot (plunger). One then randomly selects one spot on the sample which is marked with an "X". This is followed by gently placing the "X" spot between the foot and anvil of the gage and one records the thickness reading as it appears on the digital readout after it becomes stable. One then determines the final thickness using another specified Ames gage with has a 795 gram loading, ½" diameter anvil and 3/16" diameter foot (plunger) as follows: One gently places an "X" spot between the foot and anvil of the gage and records the thickness reading as it appears on the digital readout when it becomes stable. All thickness data are recorded. One calculates the % compressibility by using the following formula: % Compressibility=(Initial Reading−Final Reading/Initial Reading)×100%.

It should be clear from the above description and comparison of properties that the present invention provides a process for producing a polishing pad in an uncomplicated continuous manner. The pads formed by this process may provide a wide latitude of properties due to the combinations of compositions that are possible. Further, a novel means for providing improved fiber to binder adhesion is provided through the use of bicomponent fibers and matching the molding conditions of the top layer to the melting point of the sheath component of the bicomponent fibers used.

The polishing pad of the present invention is particularly suitable for the chemical mechanical polishing of semiconductor wafers. The polishing pad may, however, be used for polishing other substrates, such as metal, ceramic, glass, wafers, or hard disks, in polishing applications that use a liquid medium to carry and disperse abrasive particles between the polishing pad and the substrate being polished. Having described preferred embodiments of the invention it will now become apparent to those of ordinary skill in the art that other embodiments incorporating the concepts of the present invention may be used. Accordingly, it is submitted that the invention should not be limited by the described embodiments but rather should only be limited by the spirit and scope of the appended claims.

What is claimed is:

1. A process for manufacturing a polishing pad, comprising the steps of:
   (a) providing a non-woven fibrous component at a basis weight of 100–2500 g/m², wherein said non-woven fibrous component comprises bicomponent fibers with two polymers contained within the same filament;
   (b) providing a polymer matrix to coat said non-woven fibrous component;
   (c) combining said non-woven fibrous component with said polymer matrix; and
   (d) subjecting said polymer matrix and non-woven fibrous component to a temperature range and pressure to set density and thickness and form a composite sheet, and wherein said pad has a Shore D hardness of between about 10D to 70D.

2. The process of claim 1 wherein said bicomponent fibers include one component with a melting point of $Tm_1$, one component with a melting point $Tm_2$, wherein $Tm_1 < Tm_2$, and wherein $Tm_1$ is within said temperature range.

3. The process of claim 1 wherein said fibrous component includes a binder fiber with a melting point that is within said temperature range.

4. The process of claim 1 wherein said temperature range is about 200–550° F.

5. The process of claim 1 wherein said pressure is up to about 2000 psi.

6. The process of claim 1 wherein said pressure is between about 500–2000 psi.

7. The process of claim 1 wherein said composite sheet includes a top surface and said top surface is abraded.

8. The process of claim 1 further including the step of cutting said composite sheet into shape to form said polishing pad.

9. The process of claim 1 wherein said bicomponent fibers are of a sheath/core configuration.

10. The process of claim 1 wherein the bicomponent fibers are comprised of polyethylene, polyethylene terephthalate, polyester, polyamide or polypropylene.

11. The process of claim 1 wherein the polymeric matrix component comprises a polyurethane, a polyacrylate, a polystyrene, a polyimide, a polyamide, a polycarbonate, an epoxy or combinations thereof.

12. The process of claim 1 further comprising providing a soluble or swellable polymer which solubilizes or swells in a polishing slurry.

* * * * *